Sept. 13, 1966  F. THOMPSON  3,272,358
TRUCK UNLOADING STRUCTURE
Filed March 30, 1964  4 Sheets-Sheet 1
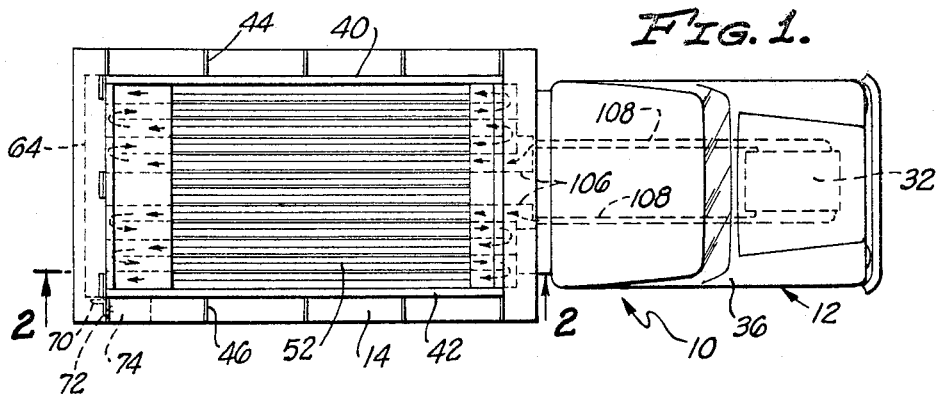
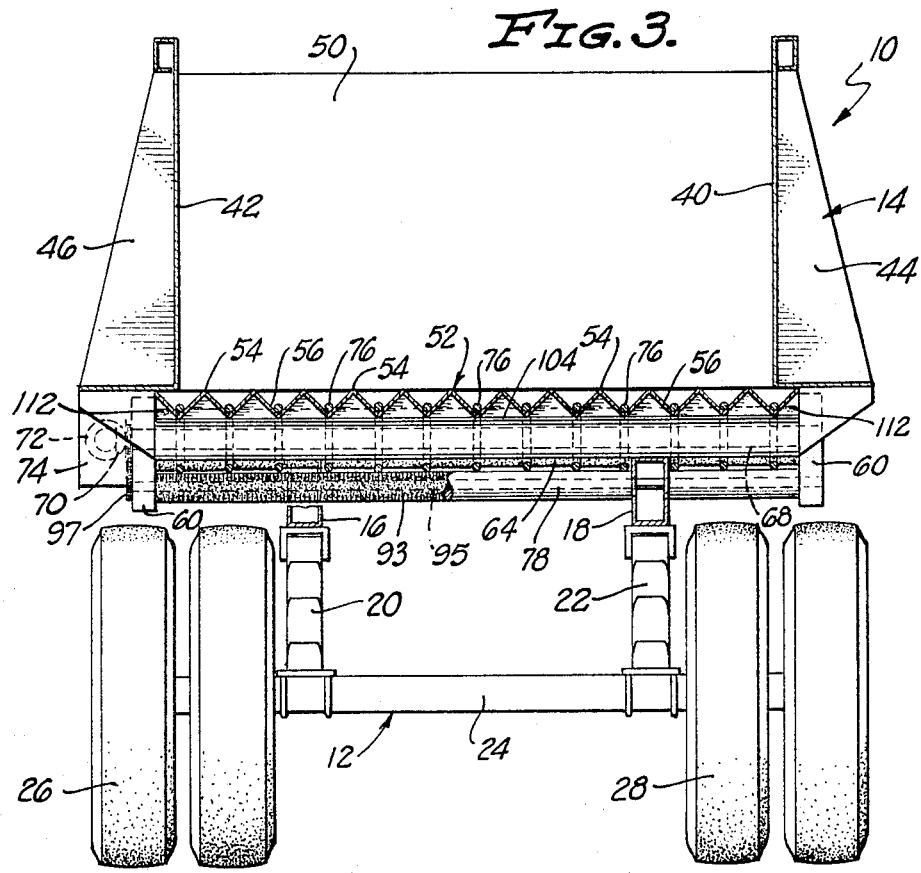
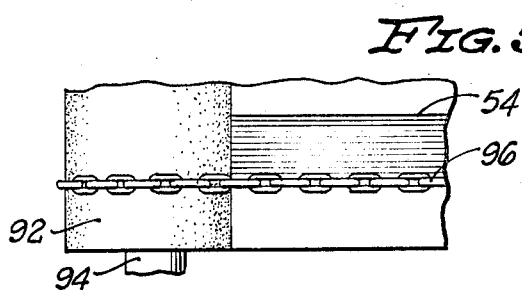
INVENTOR.
FRED THOMPSON
BY
EDWARD D. O'BRIAN
ATTORNEY Sept. 13, 1966 F. THOMPSON 3,272,358
TRUCK UNLOADING STRUCTURE
Filed March 30, 1964 4 Sheets-Sheet 2
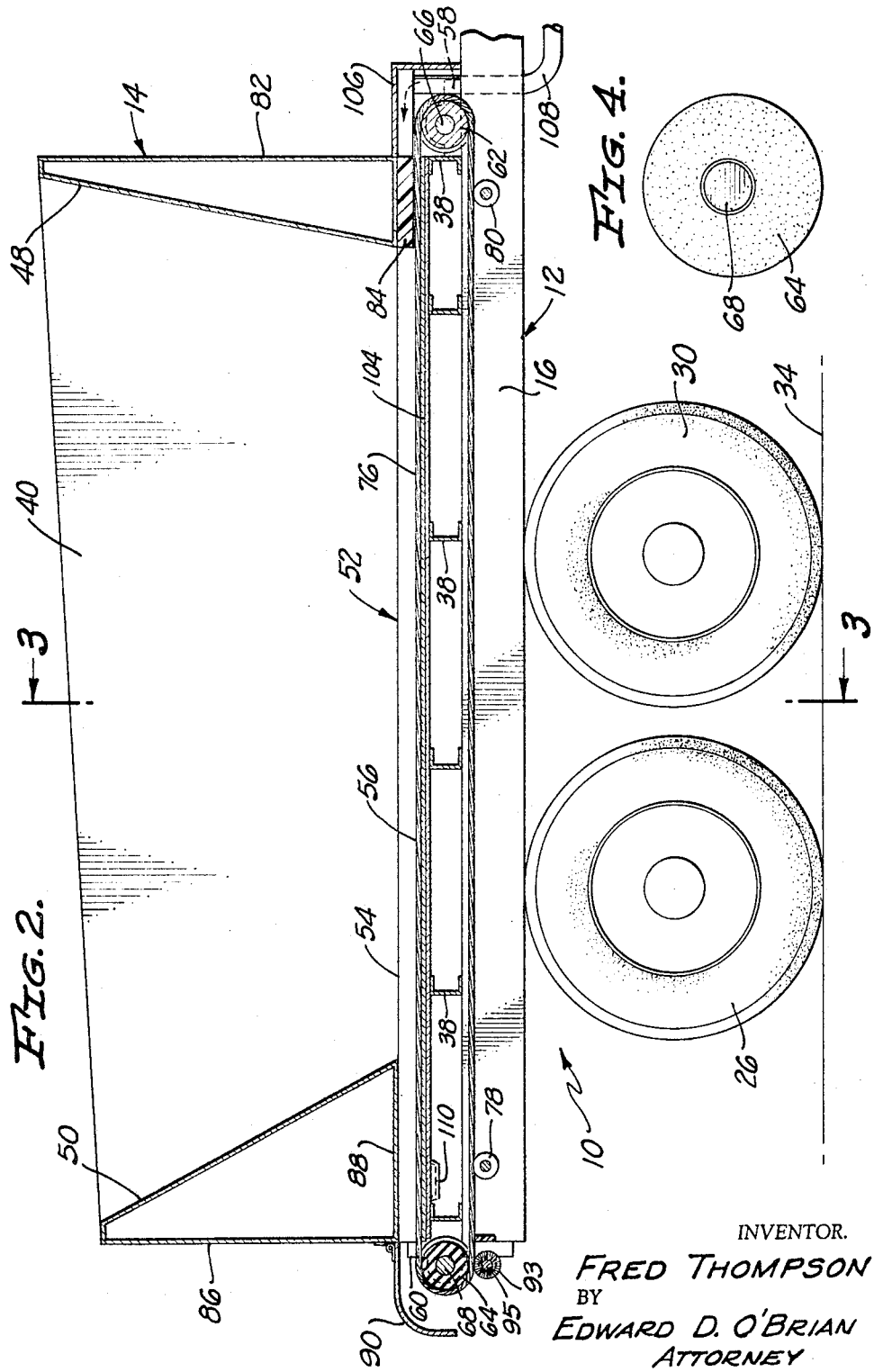
INVENTOR.
FRED THOMPSON
BY
EDWARD D. O'BRIAN
ATTORNEY

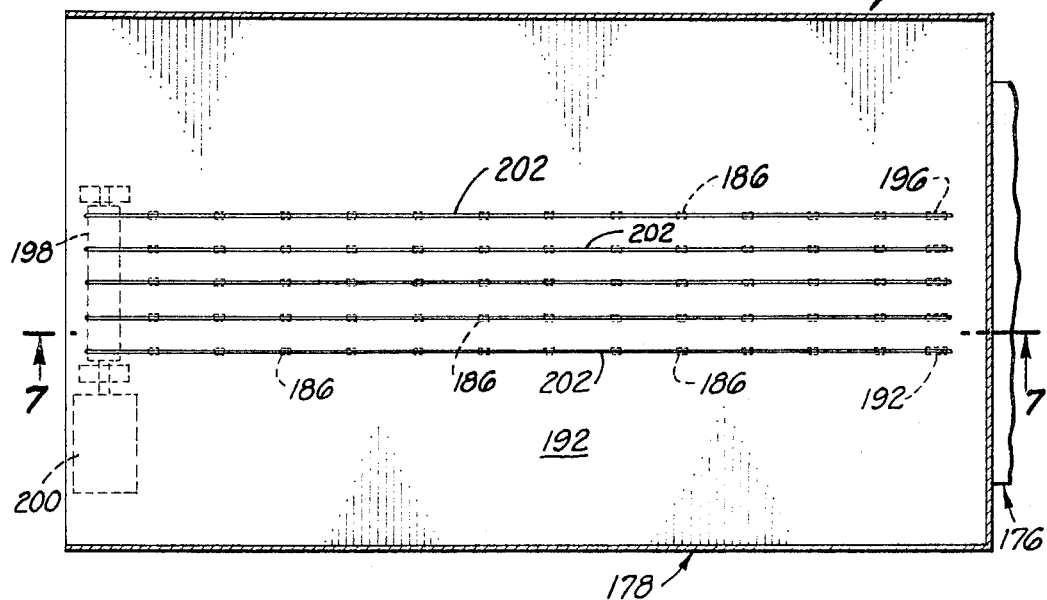
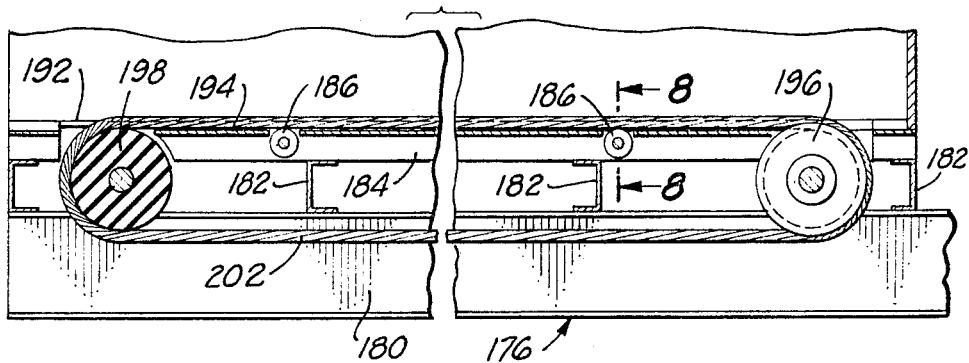
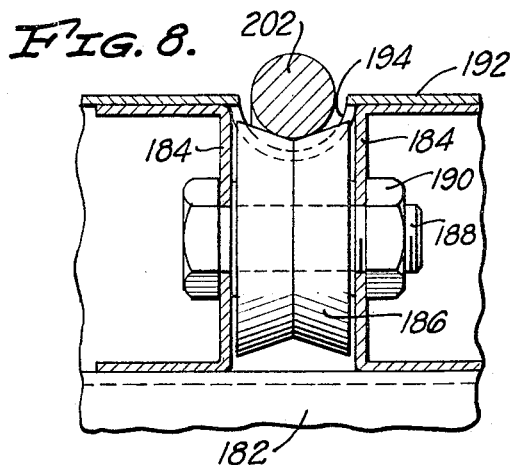
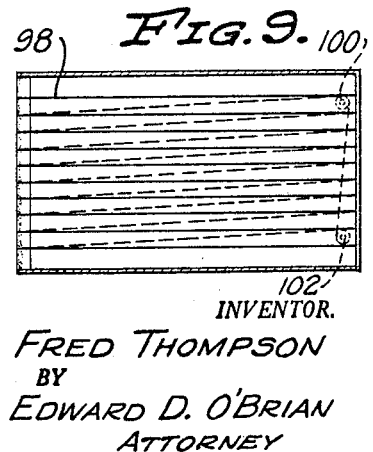
INVENTOR.
FRED THOMPSON
BY
EDWARD D. O'BRIAN
ATTORNEY

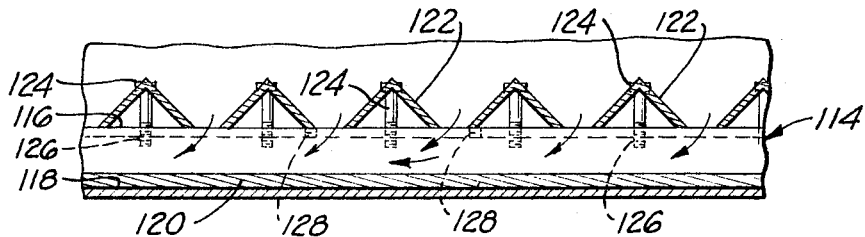
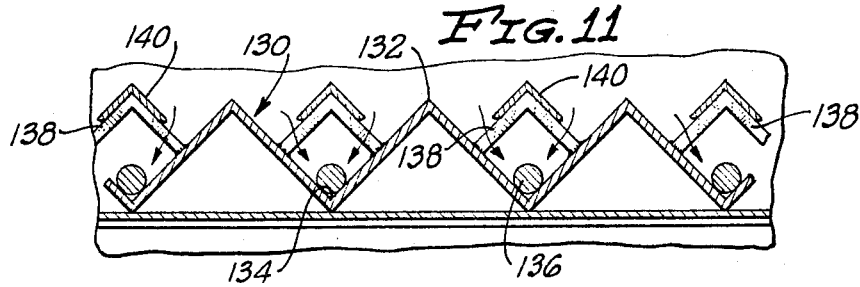
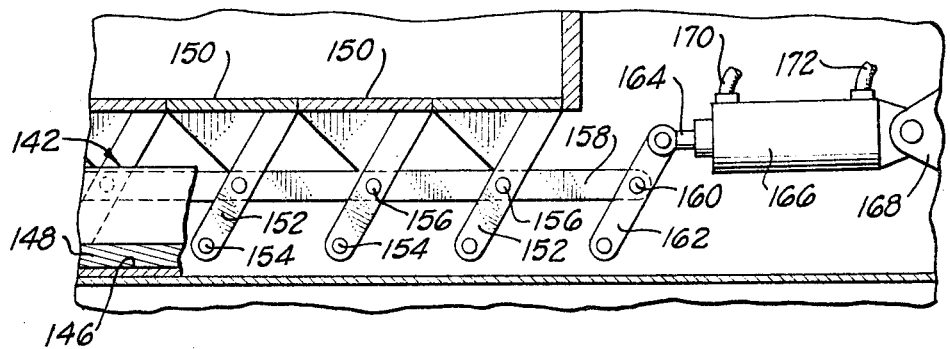
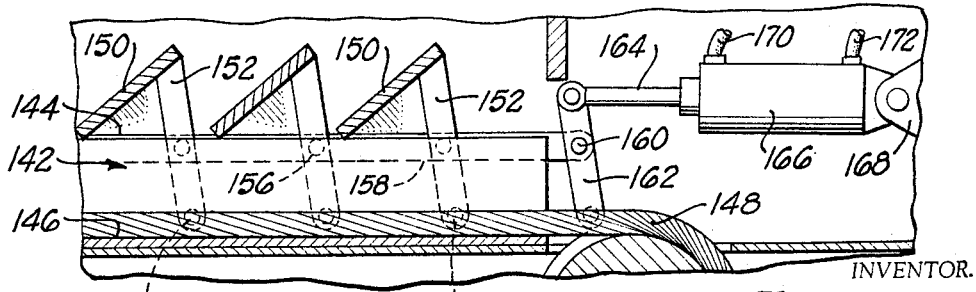

United States Patent Office 3,272,358
Patented Sept. 13, 1966

3,272,358
TRUCK UNLOADING STRUCTURE
Fred Thompson, Anaheim, Calif., assignor of one-half to Donald J. Vierstra
Filed Mar. 30, 1964, Ser. No. 355,612
3 Claims. (Cl. 214—83.2)

This invention is directed to unloading structure particularly adapted for the unloading of bulk materials from bins or vessels of such materials. It is particularly adaptable for the unloading of bulk materials from vehicle bodies.

Many vehicles today carry the goods and materials required for the sustenance and growth of the present day economy. These materials and goods are often in package form, and are often in the form of bulk, granular materials. Furthermore such goods are often moved by rail, by air or by water in different kinds of vehicles particularly adapted to the medium with which they move. The removal of such goods from vehicles has previously been an expensive, difficult, labor consuming task which consumes time in which the vehicles are inactive and ineffective for transportation.

This invention has as an object to provide a novel unloading structure which quickly unloads materials from the vehicle with a minimum consumption of time, man power and power so that the vehicle may quickly return to transportation service.

It is another object of this invention to provide vehicle unloading structure which is light in weight and reliable so that a maximum of payload can be hauled with a minimum of maintenance.

It is another object of this invention to provide an embodiment of vehicle unloading structure particularly adapted for the unloading of bulk, granular materials and an embodiment particularly adapted for the unloading of packaged materials.

It is another object of this invention to provide a vehicle unloading structure having means to control the rate of discharge of bulk, granular materials and the direction of discharge thereof.

Other objects and advantages of this invention will become apparent from the reading of the following portion of this specification, the claims and study of the drawings in which:

FIG. 1 is a top plan view of a truck having the unloading structure of this invention particularly adapted for the unloading of bulk, granular materials;

FIG. 2 is a vertical section taken along the line 2—2 of FIG. 1;

FIG. 3 is a vertical section taken along the line 3—3 of FIG. 2;

FIG. 4 is an end elevation of one of the rollers employed in the unloading structure of this invention;

FIG. 5 is a partial top plan view of a modified form of the preferred unloading structure shown in FIG. 1;

FIG. 6 is a top plan view of a vehicle floor showing an embodiment of this invention particularly adapted for the unloading of packaged materials;

FIG. 7 is an enlarged vertical section, with parts broken away, taken along the line 7—7 of FIG. 6;

FIG. 8 is an enlarged section taken along the line 8—8 of FIG. 7;

FIG. 9 is a schematic top plan view of a modified bulk vehicle unloading structure;

FIG. 10 is an enlarged longitudinal section through the floor of a bulk vehicle unloading structure of further embodiment;

FIG. 11 is a partial transverse section through the floor of another embodiment of a bulk material vehicle unloading structure;

FIG. 12 is a partial longitudinal section through the floor of yet another embodiment of a bulk material vehicle unloading structure; and FIG. 13 is a partial longitudinal vertical section similar to the section of FIG. 12, showing the structure of FIG. 12 in another position.

As an aid to understanding this invention it can be stated in essentially summary form that it is directed to vehicle unloading structure. The actual member urging goods toward unloading is an elongated flexible member, preferably a cable, of wire, polymer composition or natural material, or a metallic chain. For unloading packaged material, the elongated member moves slowly along the floor of the vehicle in engagement with the bottom of the packaged goods to propel it out of the vehicle. In the case of bulk, granular materials the elongated member moves at relatively high speed to engage a portion of the granular material and move it toward the unloading position. It is clear that such unloading structure is particularly adapted for use with highway vehicles, but is also useful in the floors of railroad, water and air vehicles.

This invention will be understood in greater detail by a study of the following portion of the specification wherein the drawings are referred to in detail. The preferred embodiment of the truck unloading structure is shown in combination with a truck in FIGS. 1 through 5 wherein the combination is generally indicated at 10. This combination includes what is generally termed a truck chassis 12 and a truck body 14.

The truck chassis 12 conventionally includes longitudinal frame members 16 and 18 which are secured through the springs 20 and 22 to suitable rear axles, such as the one indicated at 24 which in turn support the chassis 12 by carrying ground engaging wheels 26, 28 and 30. The wheels supported on axles 24 are preferably driven by an engine 32 to thus propel the structure 10 along the ground 34. The front end of structure 10 is conventionally provided with steerable guidance and supporting wheels and carries protective structure 36 which protects the engine 32, the operator and the operator's controls from the weather.

The body 14 comprises a plurality of structural member's preferably channels 38 which lie transversely to and are secured to the longitudinal frame members 16 and 18 of the chassis 12. An additional channel is preferably secured longitudinally of body 14 along each end of channels 38 to provide structural rigidity to the body 14 independently of the chassis 12. Suitably supported by means of channels 38 and above them are sides 40 and 42 which are transversely strengthened by a plurality of gusset plates 44 and 46 which are also supported from transverse channels 38. The body 14 also has a front wall 48 and rear wall 50 which are both joined to sides 40 and 42 to form four wheels which horizontally define a bulk material carrying space.

The floor 52 incorporates the unloading structure of this invention and cooperates with the remaining portion of body 14 for proper operation. The floor 52 is made up in such a manner as to provide a plurality of ridges 54 and valleys 56 therebetween. The structure may be fabricated from a plurality of angles joined together as by welding or may be fabricated by rolling from one or more sheets of material. Preferably the angles which create the ridges and valleys are substantially right angles, but for particularly advantageous use of some materials, and especially in the case where the floor 52 is rolled to the desired configuration, the shape thereof may be slightly modified. However, the preferred embodiment has angles in the floor 52 which are substantially right angles. The ridges 54 and 56 are arranged longitudinally of the body 14 and are of such dimension and oriented in such manner that the sides 40 and 42 extend partially over the outermost valleys 56, as is shown in FIG. 3.

Front and rear pillow blocks 58 and 60 are structurally mounted with respect to the body 14 and carry front and rear rolls 62 and 64, respectively, on front and rear shafts 66 and 68. Both rolls 62 and 64 are suitably grooved to accommodate the hereinafter described tension elements. Front roll 62 is preferably of metallic nature for adequate resistance to wear of both the tension elements and the roller. The rear roller 64 is preferably of polymer composition material of high co-efficient of friction and of wear resisting qualities. Gear 70 is mounted on shaft 68 and gear 72 is in engagement with gear 70 to provide a right angle drive. Power unit 74 is mounted at the side of body 14 and supplies power to rotate roll 64. Power unit 74 is preferably an electric motor connected through suitable gear reduction to gear 72, but alternatively may be a hydraulic or pneumatic unit. Furthermore, the power for driving roll 64 may be taken mechanically from a power take-off unit directly connected to engine 32.

Actual unloading is accomplished by a plurality of endless units 76 which individually embrace the rolls 62 and 64. The grooves in these rollers are positioned so that the endless units 76 when in position in the grooves lie in the bottoms of valleys 56. There is one such endless unit 76 in each of the valleys 56. Guide rolls 78 and 80 keep the units 76 from hanging too low on their return path. Roll 64 has its surface eccentric with respect to shaft 68 so as to cause vibration of the endless units and adjacent structure to aid in the discharge of granular materials.

It can be seen that if granular material such as sand is deposited between the side walls and front and rear walls of the body 14, and rests upon floor 52, the granular material enters within the valleys 56 and around the endless units 76. A front false wall 82 is positioned somewhat in front of the front wall 48 and for the distance between these walls the valleys 56 are filled with filler strips 84 which reasonably closely engage the units 76 to prevent the granular material from coming out of the front of the body 14 through the valleys 56. Similarly, the rear of the body 14 is provided with a rear false wall 86 which, at its bottom, is positioned some distance from the rear wall 50. Closure plate 88 extends between the rear walls 50 and 86 and rests upon the ridges 54 of floor 52. The valleys 56 remain open in the rearward direction.

When the power unit rotates roll 64 to turn counter-clockwise, as seen in FIG. 2, the endless units 76 are drawn through the granular material. A certain amount of the granular material is moved with the endless unit 76 and is discharged out of the rear of the body 14. When the endless units 76 are operated at the proper speed, at least several hundred feet per minute, a considerable amount of material is moved therewith to give the impression that it is entrained therewith. The material thus moved is projected straight out of the rear end of the body 14, out of the valleys 56 and discharges freely over the top of roll 64. The amount of material engaged between the endless units 76 and roll 64 is insufficient to cause problems. The speed of the units 76 projects the granular material rearwardly, as above described, so that tail gate 90 is hingedly, adjustably mounted on rear false wall 86 so as to adjustably intercept the projection of material to guide the material where it is desired. When tail gate 90 is swung upward, and when the endless units 76 are operating at adequate speed, the material can be projected a considerable distance. The endless units 76 themselves can be made of several different kinds of material. In the preferred embodiment the units 76 are made of twisted strands of natural materials such as manila hemp or of synthetic polymer composition material such as nylon twisted and fashioned similar to rope, or they may be made of metallic wire twisted into the form of a wire rope. In FIG. 5 a modified embodiment is shown wherein the rear roll 92, mounted on and powered by rear shaft 94, corresponding to roll 64 and shaft 68, respectively, carry link chains one of which is shown at 96 to form the endless units. The chain 96 is of metallic nature and rear roll 92 is sufficiently resilient to partially resiliently embed the chain link as it is drawn therearound. Alternatively rear roll 92 is formed to accept the individual chain links for positive driving thereof. In order to clean the endless units and roll 64 when they are used to discharge sticky materials such as asphalt, brush roll 93 is rotated in contact therewith. Brush roll 93 is mounted on brush roll shaft 95 which is journaled in pillow blocks 60. Brush roll 93 is driven in a counter-clockwise direction as seen in FIG. 2 by a chain 97 from rear shaft 68.

Another embodiment is shown in FIG. 9 wherein the endless unit 98 is continuous through all of the valleys 56. Guide rolls 100 and 102 guide the endless unit 98 between the channels from one side to the other of the body 14, and the previously described front and rear rolls guide the endless unit 98 through one valley 56 and then slightly diagonally underneath the body 14 to the next valley, and then similarly through the remainder so that it is finally returned to the beginning point by guidance of guide rolls 100 and 102. It can be seen that a single endless unit 98 can be used in such a case rather than the plurality of equal length units 76 as have been previously described. Certain advantages accrue from the use of one unit 98, for the relative length and consequent relative tensions of individual endless units need not be considered. However, the individual units shown in FIGS. 2 and 3 are preferred for if one of them breaks, the unloading structure is not completely disabled, but most of the material can be unloaded by the remaining endless units 76.

It is clear from the previous description that the floor 52 described with respect to FIGS. 1, 2 and 3 can readily be mounted directly upon the channels 38. In some cases it is desirable to heat the load carried within the body 14 and to effect this result, the floor 52 is heated by means of exhaust gases from the engine 32. To accomplish this result, bottom plate 104 is secured to the top of the channels 38 and the floor 52 is secured thereto. In view of the fact that the floor 52 is formed in the previously described ridges and valleys, it also defines longitudinal spaces therebeneath and in association with the bottom plate 104. Two of these spaces are connected by appropriate manifolds 106 to the exhaust pipes 108 from the engine 32. Thus the exhaust gases from the engine are discharged through pipes 108, manifolds 106 and rearwardly through two of the spaces between the floor plate and the bottom plate. Adjacent the rear thereof, each of these spaces is connected to an adjacent space by means of exhaust manifold 110 extending below the bottom plate 104 and bridging from one space to the other. Hence the exhaust gas flows into the adjacent space where it again is manifolded to move rearwardly. The end of the spaces is suitably closed to cause this path for the exhaust gases. The outermost channels 112 are opened at the rear end to permit discharge of the exhaust gases to atmosphere. It can be seen that this structure adds heat to the floor 52 so that such materials as hot mix can be carried to a road building job and discharged at proper temperature. If desired, the manifolds 106 can be arranged with by-passes so that the exhaust gases need not go under the floor 52, but can be directed to atmosphere if desired.

The vehicle body 14 is capable of carrying a wide variety of different bulk materials so long as the granular size is sufficiently small to permit individual particles of such material to pass through the valleys 56 beneath closure plate 88. The unloading structure of FIGS. 1, 2 and 3 is capable of handling granular material of widely different fluidity. In the cases of material of higher fluidity, it may be desirable to restrict the access of such materials to the endless units operating in the valley. By such restriction power requirements to drive the endless units are reduced.

Referring now to FIG. 10, a section of a floor 114 similar to the floor 52, is shown. The floor 114 comprises a plurality of longitudinal ridges 116 and valleys 118 arranged in the manner of floor 52. Endless units 120 are positioned in the valleys 118 and are arranged to be drawn therethrough to withdraw material along the valleys 118 for discharge out of the end thereof. In order to restrict access of the granular material to the valleys 118, a plurality of angles 122 are secured transversely of the vehicle body and at right angles to the valleys 118 along the top of ridges 116. Securement is accomplished by means of screws 124 entering into tapped holes 126. The tapped holes 126 are spaced in such manner as to give a desirable spacing for the angles 122. Additional tapped holes 128 are provided so that the angles 122 can be placed across the ridges 126 with a different spacing therebetween. Thus it can be seen that the angles 122 restrict flow of granular materials to the endless units 120 to thus control the flow thereto. Furthermore the spacing of angles 122 can be varied depending upon the fluidity of the granular material to obtain proper flow and yet limit the power requirements for driving the endless units.

FIG. 11 illustrates another embodiment of structure to control the flow of granular material to the endless units. FIG. 11 illustrates a transverse section of a suitable further embodiment of a floor useful in the body 14. The floor 130 therein is suitably fabricated of angles or rolled from sheet to provide ridges 132 and valley 134 with endless units 136 running therein as has been previously described with respect to floor 52. In order to control flow of granular material from the main volume of the body into the valleys 134 and into contact with endless units 136 bridges 138 of relatively narrow material are spaced along the length of valleys 134. Mounted on top of bridges 138 are covers 140 which are in the nature of angles and which extend throughout substantially the entire front to back length of floor 130 which is open to the load from above. If desired, covers 140 may be removable, and alternative covers 140 of somewhat different sizes may be substituted therefor to accommodate the different fluidity of different granular material. This structure can also be seen to control the rate of flow of granular materials to endless units 136, depending on the fluidity of the material and the size of the covers 140. Thus the power requirement to the endless units 136 is controlled.

FIG. 12 and 13 show a further embodiment of means to control the flow of granular material to the endless units to thus control the amount of power required to drive the endless units. The embodiment of FIGS. 12 and 13 is provided with a floor 142 identical to that shown in FIGS. 1, 2 and 3. The floor 142 includes ridges 144 and valleys 146 with endless units 148 being positioned to be drawn through the valleys. A plurality of flow control plates 150 are each secured to levers 152 which are pivoted to the body at 154. The levers 152 are connected together by being pivoted at 156 to long link 158. Link 158 is in turn pivoted at 160 to lever 162 which is pivoted to the body on one end and pivoted to piston rod 164 at its other end. Piston rod 164 is connected to a piston in cylinder 166 which in turn is secured to the body by means of trunnion 168. When the piston rod 164 is retracted into cylinder 166 by application of fluid under pressure to fluid line 170, the long link 158 is drawn to the right, as seen in FIGS. 12 and 13, and the flow control plates 150 pivot around pivots 154 to become substantially coplanar and become substantially adjacent each other so that they completely close and prevent flow of granular material from the upper, storage portion of the body on to floor 142.

When fluid under pressure is introduced into fluid line 172, the piston rod 164 moves to the left, into the position shown in FIG. 13, so that the plates 150 pivot around their pivot points 154. This tilts the flow control plates 150 so that they are no longer adjacent each other and so that there are openings therebetween to permit the flow of granular material on to floor 142 and thus empty valleys 146. Thereupon the granular material is drawn through the valleys out of the end thereof by flexible endless units 148.

As has been previously mentioned, the vehicle unloading structure of this invention is also suitable for the handling of packaged material, as contrasted to bulk, granular materials. As is seen in FIGS. 6, 7 and 8, the embodiment of the vehicle unloading structure of this invention is applied to a vehicle 174 which has a chassis 176 and a body 178 secured thereto. As is seen in FIG. 7 the chassis 176 comprises longitudinal frame members 180 across which are mounted body floor supporting channels 182. Longitudinal channels 184 are longitudinally mounted on top of channels 182 and are positioned in back to back relationship to support rollers 186 therebetween. Rollers 186 are supported upon bearings in the form of bolts 188 secured by nuts 190. Suitable spaces and bearing elements are provided for the free turning of rollers 186. Rollers 186 are in the form of double frustocones to provide a roll with a V surface for the guidance of an endless unit. A plurality of rollers 186 is provided over the floor as is shown in FIG. 6.

Floor plate 192 is provided with valleys 194 in line with a plurality of rollers 186 and of round bottom nature to minimize wear on endless units passing therethrough. At the front of the body 178 are secured a plurality of guide rolls 196 which are freely rotatably mounted with respect to the body and are positioned in line with valleys 194. At the rear of body 178 roll 198 is journaled for rotation with respect to the body and is powered by means of power source 200. Endless units 202 extend around guide roll 196, drive roll 198, through valleys 194 and over rollers 186. It can be seen that powering of roller 198 moves the endless units 202 along the floor of body 178. In view of the depth of guide valleys 194 and the positioning of guide rollers 186, it is clear that the endless units 202 extend above the top of floor plate 192. Thus the placing of packages upon the endless units conveys them along the floor of the body 178. The power source 200 is reversible so that the packaged goods can be moved either into or out of the body 178.

In the embodiment of FIGS. 6, 7 and 8, the endless units 202 are preferably of twisted strands of natural, polymer composition or metallic material so that they freely move with a minimum of friction and wear within the guide valleys 194. In the cases of the earlier described embodiments, the granular material served as a wear resisting medium between the endless units and the valleys, but since in this case the embodiment is particularly useful for packaged materials, no such opportunity exists. Accordingly the bottoms of the valleys 194 and the endless units 202 should be as smooth as possible to minimize wear and keep friction at a low level.

It is clear that this invention is adaptable to numerous changes, modifications and embodiments by the routine engineer without the exercise of the inventive faculty. Accordingly the scope of this invention is defined by the scope of the following claims.

I claim:

1. A vehicle comprising:
   a frame, means connected to said frame to support said frame, means connected to said frame to propel and guide said frame and a body mounted on said frame;
   said body comprising side walls, a front wall, a rear wall and a floor to define a load space adapted for the carrying of granular materials;
   said floor comprising a plurality of ridges and valleys in side by side relationship and extending from said front wall to said rear wall substantially parallel to said side walls and extending in side by side relationship from one side to the other side, a bottom plate positioned below said ridges and valleys so as to form passages beneath said ridges, manifolds connected to said passages and connecting means on one of said manifolds adapted to connect to a source of heating fluid so that heating fluid is adapted to pass successively through at least some of said passages to heat said floor, a front roll and a rear roll mounted with respect to said floor adjacent the front and the rear, respectively, of said valleys, flexible units extending around said front roll and said rear roll and through said valleys so that upon rotation of said rolls said flexible units move through said valleys, and motor means to rotate at least one of said rolls.

2. A vehicle, said vehicle comprising:

a frame, means connected to said frame to support said frame, means connected to said frame to propel and guide said frame and a body mounted on said frame;

said body comprising side walls, a front wall, a rear wall and a floor to define a load space adapted for the carrying of granular materials;

said floor comprising a plurality of ridges and valleys in side by side relationship and extending from said front wall to said rear wall substantially parallel to said side walls and extending in side by side relationship from one side to the other side;

material flow control means positioned adjacent said floor to control the flow of granular materials into said valleys, said material flow control means comprising a plurality of ridges bridging one of said valleys and an angular member positioned on said ridges so as to restrict flow of material into said valley; and a front roll and a rear roll mounted with respect to said floor adjacent the front and the rear, respectively, of said valleys, flexible units extending around said front roll and said rear roll and through said valleys so that upon rotation of said rolls said flexible units move through said valleys, and motor means to rotate at least one of said rolls.

3. The vehicle of claim 2 wherein said angular member is positioned substantially parallel to said one of said valleys.

References Cited by the Examiner

UNITED STATES PATENTS

| 1,752,549 | 4/1930 | Beardsley et al. | |
|---|---|---|---|
| 1,921,959 | 8/1933 | Warren | 214—83.2 |
| 2,412,121 | 12/1946 | Bradshaw | 222—271 |
| 2,503,129 | 4/1950 | Pautz | 214—83.26 X |
| 2,957,572 | 10/1960 | Dvorak | 198—190 X |
| 2,994,299 | 8/1961 | Cordis | 119—52 |
| 2,995,109 | 8/1961 | Cordis | 119—52 |

GERALD M. FORLENZA, *Primary Examiner.*

ALBERT J. MAKAY, *Examiner.*